(12) United States Patent
Dunnwald

(10) Patent No.: US 9,617,081 B2
(45) Date of Patent: Apr. 11, 2017

(54) APPARATUS FOR STRIPPING OFF MATERIAL FROM A CONVEYING BELT OF A BELT CONVEYOR

(71) Applicant: ScrapeTec GmbH, Kamp-Lintfort (DE)

(72) Inventor: Wilfried Dunnwald, Kamp-Lintfort (DE)

(73) Assignee: ScrapeTec GmbH, Kamp-Lintfort (DE)

(*) Notice: Subject to any disclaimer, the term of this patent is extended or adjusted under 35 U.S.C. 154(b) by 0 days.

(21) Appl. No.: 15/103,514

(22) PCT Filed: Dec. 11, 2014

(86) PCT No.: PCT/EP2014/077424
§ 371 (c)(1),
(2) Date: Jun. 10, 2016

(87) PCT Pub. No.: WO2015/086763
PCT Pub. Date: Jun. 18, 2015

(65) Prior Publication Data
US 2016/0311626 A1    Oct. 27, 2016

(30) Foreign Application Priority Data

Dec. 12, 2013  (DE) .................. 10 2013 113 934

(51) Int. Cl.
*B65G 45/12* (2006.01)
*B65G 45/16* (2006.01)

(52) U.S. Cl.
CPC ............. *B65G 45/12* (2013.01); *B65G 45/16* (2013.01)

(58) Field of Classification Search
CPC ......... B65G 45/12; B65G 45/14; B65G 45/16
(Continued)

(56) References Cited

U.S. PATENT DOCUMENTS 3,782,534 A * 1/1974 Holleman .............. B65G 45/12
                                                               198/499
4,821,867 A * 4/1989 Veenhof ................. B65G 45/12
                                                              15/256.5
(Continued)

FOREIGN PATENT DOCUMENTS

BR        PI0403621 A    4/2006
FR        2586236 A1     2/1987
(Continued)

*Primary Examiner* — Mark A Deuble
(74) *Attorney, Agent, or Firm* — The Webb Law Firm

(57) ABSTRACT

An apparatus for stripping off material from a conveying belt of a belt conveyor in the region of the curve of a discharge drum, beneath the discharge point of the belt conveyor includes a plurality of stripping members arranged in a row and are carried by at least two elongate flexible carrying elements spaced apart from one another. At least one of the stripping members includes a first stripping element and a second stripping element and is additionally provided with a lifting mechanism which causes the first stripping element to be lifted from the conveying belt when the first stripping element is moved in a direction of travel of the conveying belt. The first stripping element is mounted on the stripping member so as to be movable relative to the lifting mechanism. The lifting mechanism may be in the form of an articulated lever mechanism or spring lever mechanism.

20 Claims, 12 Drawing Sheets

(58) Field of Classification Search
USPC .......................................................... 198/819
See application file for complete search history.

(56) References Cited

U.S. PATENT DOCUMENTS

| | | | | |
|---|---|---|---|---|
| 5,016,746 | A * | 5/1991 | Gibbs | B65G 45/24 15/256.51 |
| 5,222,588 | A * | 6/1993 | Gordon | B65G 45/16 198/497 |
| 8,776,990 | B2 * | 7/2014 | Felton | B65G 45/16 198/499 |
| 2004/0069598 | A1 | 4/2004 | DeVries | |
| 2004/0222065 | A1 * | 11/2004 | Meguro | B65G 45/12 198/497 |
| 2006/0049023 | A1 * | 3/2006 | Dietsch | B65G 45/16 198/499 |
| 2011/0100782 | A1 | 5/2011 | Dunnwald | |
| 2012/0305367 | A1 * | 12/2012 | Dunnwald | B65G 45/16 198/499 |
| 2015/0151924 | A1 * | 6/2015 | Kishor | B65G 45/16 198/499 |
| 2016/0167892 | A1 * | 6/2016 | Kishor | B65G 45/16 15/256.5 |

FOREIGN PATENT DOCUMENTS

| | | |
|---|---|---|
| JP | 61122221 U | 8/1986 |
| JP | 331120 U | 3/1991 |
| JP | 2006117396 A | 5/2006 |
| WO | 2009121938 A1 | 10/2009 |

* cited by examiner

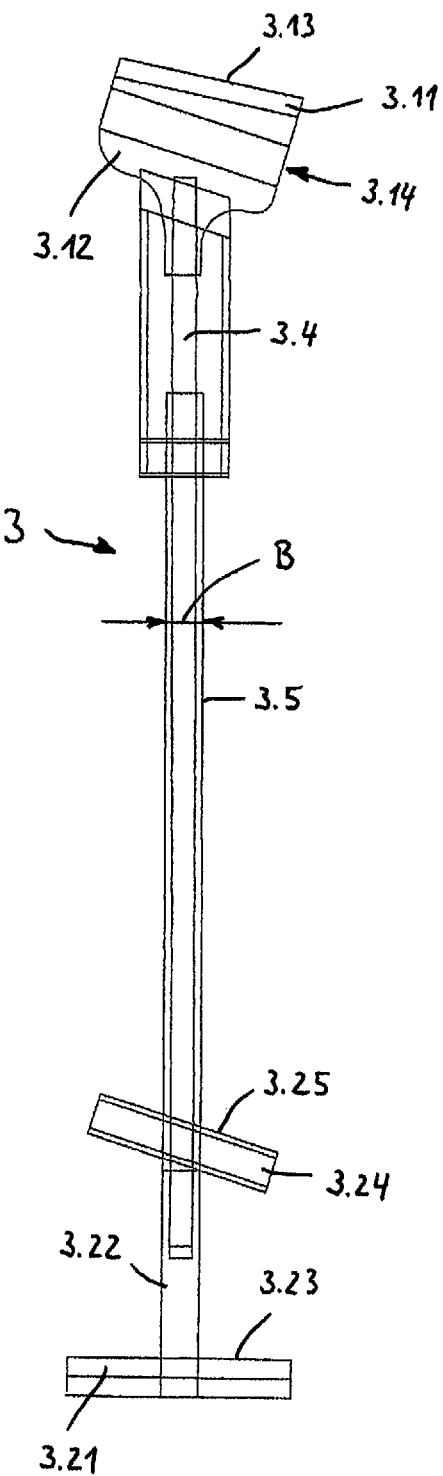

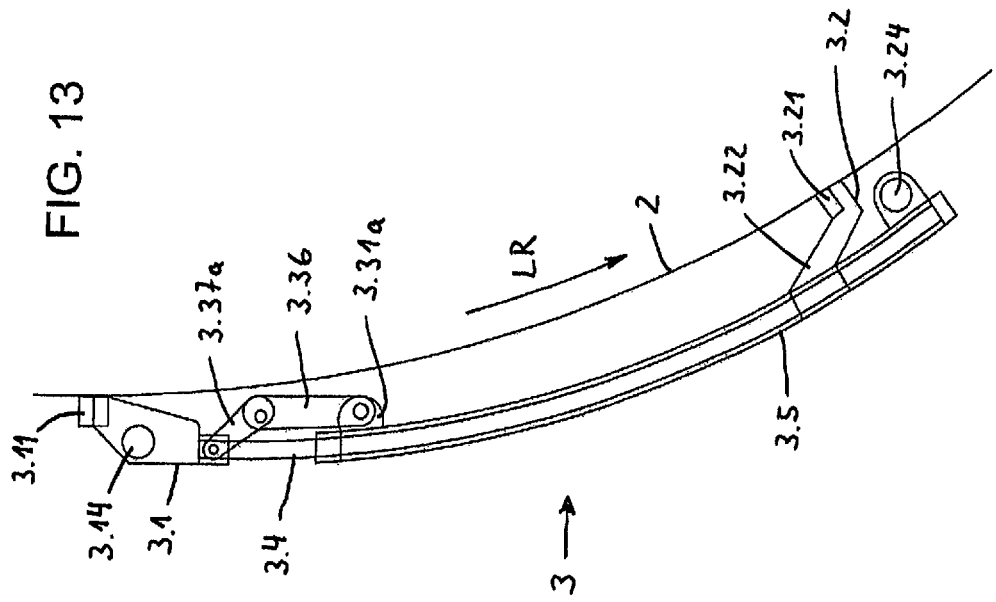

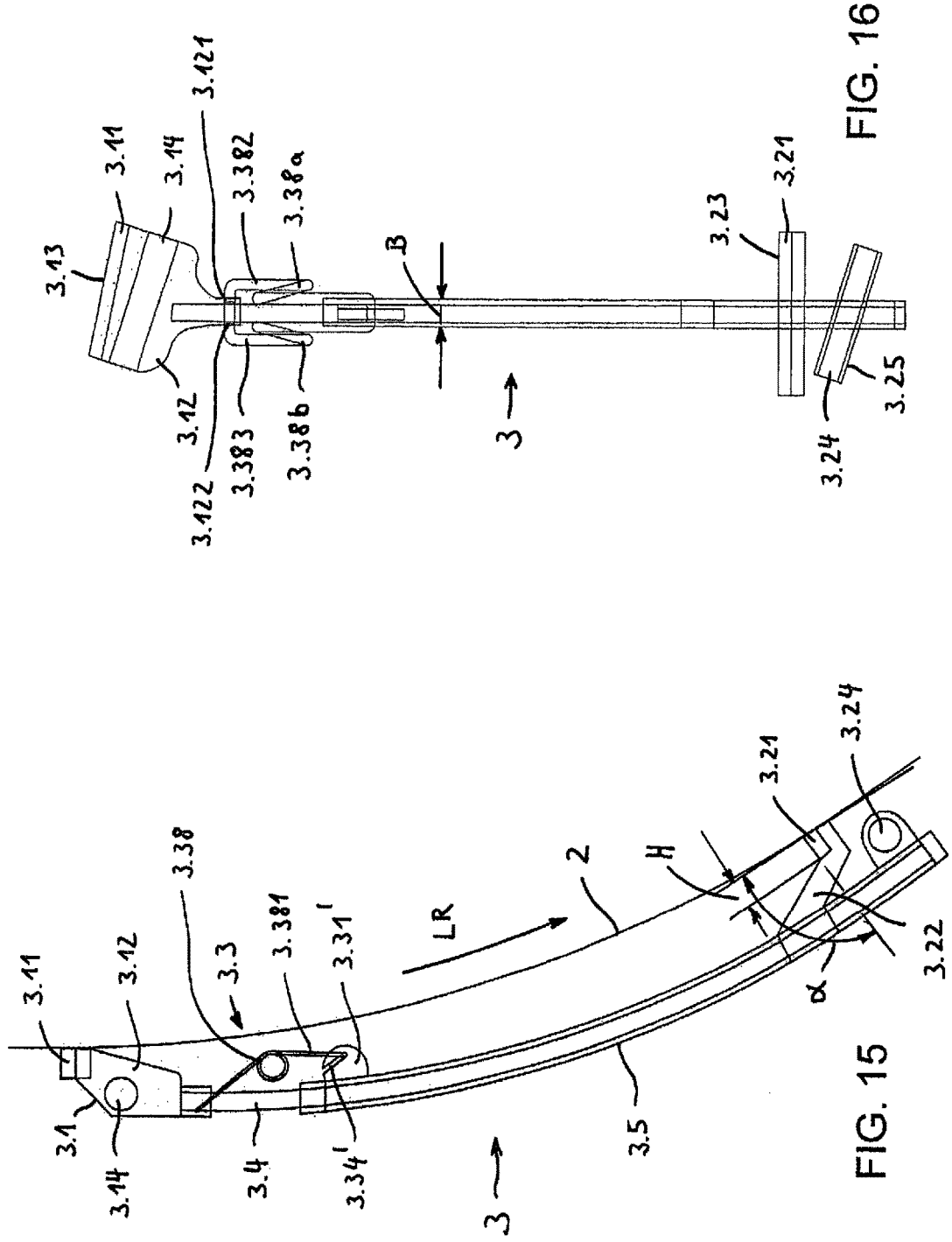

US 9,617,081 B2

APPARATUS FOR STRIPPING OFF MATERIAL FROM A CONVEYING BELT OF A BELT CONVEYOR

CROSS-REFERENCE TO RELATED APPLICATIONS

This application is the United States national phase of International Application No. PCT/EP2014/077424 filed Dec. 11, 2014, and claims priority to German Patent Application No. 10 2013 113 934.5 filed Dec. 12, 2013, the disclosures of which are hereby incorporated in their entirety by reference.

BACKGROUND OF THE INVENTION

Field of the Invention

The invention relates to an apparatus for stripping off material from a conveying belt of a belt conveyor in the region of the curve of a discharge drum, beneath the discharge area of the belt conveyor, having a plurality of stripping members which are arranged in a row and are carried by at least two elongate carrying elements arranged spaced apart from one another, at least one of the stripping members having a first stripping element and a second stripping element following the first stripping element in the direction of travel of the conveying belt.

Description of Related Art

Such an apparatus is known from WO 2009/121938 A1. The known apparatus is distinguished in that it is able to adapt to the belt surface, requires relatively little space and provides a high cleaning action with gentle treatment of the conveying belt. A one-part or multi-part stripping body is made of material that bends elastically, preferably plastics material or elastomer, the stripping body having two edge regions facing the conveying belt which are formed by wear elements having high wear resistance, for example strips of hard metal. The upper wear element, which is the first wear element when viewed in the direction of travel of the belt, acts as a stripping element, while the lower wear element, which follows when viewed in the direction of travel of the belt, is used to support the stripping body and has no stripping function at all. The material that bends elastically (matrix material), in which the wear elements are encased, for example cast, is relatively expensive.

Furthermore, from FR 2 586 236 A1 a device for stripping off material from from a conveyor belt of a belt conveyor in the region of the lower belt of the belt conveyor is known. The device comprises a longitudinal support which is arranged transversely to the running direction of the conveyor belt, the ends of the longitudinal support are mounted in such a way in two housings which are spaced apart from each other so that the longitudinal support is adjustable perpendicularly to the underside of the lower belt. On the longitudinal support a plurality of two-armed levers is attached, which levers are disposed lined up transverse to the longitudinal support. At the ends of the respective two-armed lever stoppers made of rubber are mounted, to each of said stoppers a one-armed lever (arm) is fixed, said one-armed lever carries at its end a scraper element in the form of a doctor blade associated to the a bottom belt. The one-armed levers and the scraper blades are in this case arranged staggered in four rows each.

SUMMARY OF THE INVENTION

Starting therefrom, the object of the present invention was to provide a further apparatus of the type mentioned at the outset which adapts optimally to the belt surface, requires relatively little space, provides improved cleaning action with gentle treatment of the conveying belt, and is less expensive to produce.

The object is achieved according to the invention by means of an apparatus having the features described herein.

The apparatus according to the invention is characterised in that the stripping member, which comprises the first stripping element and the second stripping element following in the direction of travel of the conveying belt, comprises a lifting mechanism which causes the first stripping element to be lifted from the conveying belt when the first stripping element is moved in the direction of travel of the conveying belt, wherein the first stripping element being mounted on the stripping member so as to be movable relative to the lifting mechanism, and wherein the first stripping element is fixed to a rod which is held in a movable manner in a guide, the lifting mechanism being attached to or integrally formed on the guide.

The stripping member of the apparatus according to the invention does not require an expensive matrix of rubber, plastics material or elastomer. Instead, the stripping members of the apparatus according to the invention can be manufactured inexpensively from metal components, for example components made of steel. In particular, the individual stripping members—apart from their stripping elements—can be relatively narrow, so that a correspondingly large free space remains between the stripping members arranged in a row. As a result of this free space, which is defined by the openings provided between the stripping members arranged in a row, accumulations of material behind the stripping members are avoided. The mass to be handled during installation of the apparatus according to the invention, or the mass to be carried by tensioning means during operation of the apparatus, is thus reduced, which simplifies the installation and anchoring (mounting) of the apparatus. The openings provided between the stripping members are additionally advantageous because they confer a high degree of flexibility upon the stripping apparatus, so that the stripping apparatus can optimally be adapted to a space curve extending at an angle to the direction of travel of the belt in the region of the discharge drum around which the conveying belt is looped.

The support element following the first stripping element in the direction of travel of the conveying belt is used as a secondary stripper, by means of which the cleaning action of the stripping apparatus is improved considerably. To that end, the second stripping element (secondary stripper) is preferably in strip form and is preferably disposed relative to the discharge drum, or to the conveying belt fitted thereto, in normal operation such that it encloses an angle between 70° and 110°, preferably between 80° and 100°, with the fitted conveying belt, or with the outer surface of the discharge drum. The height of the effective stripping surface of the second stripping element above the conveying belt is, for example, at least 1 cm, preferably at least 1.5 cm, particularly preferably at least 2 cm.

The stripping members arranged in a row of the apparatus according to the invention can optimally adapt to a space curve extending at an angle to the direction of travel of the conveying belt, the course of which space curve depends in particular on the diameter of the discharge drum. The space curve can correspond substantially to a portion of the length of a helix.

The at least two elongate carrying elements of the apparatus according to the invention are preferably flexible and/or resilient. They are, for example, each formed of at least one cable, in particular wire cable, and/or at least one metal chain. Alternatively, at least one of the carrying elements can also be formed of a flexible or resilient metal rod, preferably steel rod, in particular stainless steel rod. The carrying elements used (cables, metal chains and/or metal rods) are sufficiently flexible that the stripping members arranged in a row can be positioned on the discharge drum along a space curve by means of the carrying elements. By means of at least one of the at least two elongate carrying elements, the stripping members arranged in a row are pulled or can be pulled towards the conveying belt fitted to the curve of the discharge drum.

One of these at least two elongate carrying elements is arranged on the first stripping element (primary stripper) and at least one second carrying elements of these carrying elements is arranged close to the second stripping element (secondary stripper). The elongate carrying element arranged close to, or associated with, the secondary stripper is fixed at fixed points of the belt conveyor preferably without spring mounting or with stronger spring mounting than the carrying element arranged on the first stripping element (primary stripper).

When excessive force caused by relatively major damage to the belt or by a foreign body lodged in the conveying belt is applied, which force acts upon the first stripping element of the stripping member in question tangentially to the conveying belt looped around the discharge drum, (at least) that stripping element is moved in the direction of travel of the conveying belt, the lifting mechanism formed on the stripping member causing the stripping element to be lifted from the conveying belt as it is moved in the direction of travel of said conveying belt and thus to slide unimpeded over the damaged region of the conveying belt, or over the foreign body lodged therein. Gentle cleaning of the conveying belt is thereby ensured.

The movability of the first stripping element (primary stripper) can be achieved in a reliable and relatively simple manner if that stripping element, according to the invention, is fixed to a rod which is held in a movable manner in a guide, the lifting mechanism being attached to or integrally formed on the guide.

According to a preferred embodiment of the apparatus according to the invention, the guide is in the form of a channel and preferably has a closed cross-sectional profile. The rod is preferably manufactured from resilient material, for example from spring steel. The gentle cleaning action of the apparatus can thereby be improved further.

In another advantageous embodiment of the apparatus according to the invention, the guide and/or the rod is curved, the curvature of the guide or of the rod being substantially matched to the curve of the discharge drum of the belt conveyor. This configuration contributes towards a compact design of the apparatus according to the invention.

According to another preferred embodiment of the apparatus according to the invention, the first stripping element has a holder which is connected to the rod and which has a through-opening or clamp for attaching one of the elongate carrying elements, in particular of a carrying cable. This arrangement of the carrying element close to or directly on the first stripping element promotes the gentle cleaning of the belt conveyor, relatively small tension forces being sufficient to tension the elongate carrying element, in particular carrying cable.

Likewise advantageous for the gentle cleaning of the belt conveyor is an embodiment of the apparatus according to the invention in which the guide is provided with a projection which has a through-opening or clamp for attaching the at least one second elongate carrying element. The through-opening or clamp for attaching the at least one second elongate carrying element is preferably arranged after the second stripping element in the direction of travel of the conveying belt. If the upper elongate carrying element (for example carrying cable) arranged on the first stripping element were to break, the arrangement of the second elongate carrying element after the second stripping element in the direction of travel of the belt causes a torque, which then lifts the first stripping element from the conveying belt. Any damage which might be caused to the conveying belt by the first stripping element in the event of a broken carrying cable or carrying element is thereby prevented.

According to another advantageous embodiment of the apparatus according to the invention, the second stripping element is fixed to the guide. In this case, the second stripping element substantially retains its position even when the upper, first stripping element is moved. In this case, the second stripping element is carried substantially by the lower carrying element associated therewith and also acquires thereby the contact pressure on the conveying belt that is necessary for its cleaning action.

Alternatively, however, the second stripping element can also be fixed to the rod. In this case, when the upper, first stripping element is moved, the lower, second stripping element is at the same time moved in the same direction. In this case, the lower carrying element is used in particular to introduce the pressing force into the second stripping element, so that said second stripping element is pressed against the conveying belt and the lifting mechanism is actuated.

Another advantageous embodiment of the apparatus according to the invention is characterised in that the guides of the rods of adjacent stripping members are spaced apart from one another by a distance which is greater than the width, preferably greater than twice the width, in particular greater than three times or four times the width, of the relevant guide. The upper stripping elements of the adjacent stripping members are arranged contiguously, their front edges preferably being arranged slightly offset relative to one another in the form of steps. Relatively large gaps (free space) are thus present between the individual stripping members. Material adhering to the conveying belt which becomes detached from the conveying belt is able to escape through that free space, that is to say through the relatively large openings between the stripping members. Material which becomes detached is thus prevented from accumulating behind the stripping members.

In order to achieve a high cleaning action it is further advantageous if, according to another embodiment of the apparatus according to the invention, the second stripping elements of adjacent stripping members are arranged so as to overlap, in such a manner that a stripping element is partially covered by a stripping element of an adjacent stripping member that is located in front of it, when viewed in the direction of travel of the conveying belt, and that same stripping element partially covers a stripping element of an adjacent stripping member that is located behind it, when viewed in the direction of travel of the conveying belt.

The lifting mechanism of the apparatus according to the invention can be configured in different variants. An embodiment of the lifting mechanism which is relatively simple in terms of construction and reliable is characterised in that the stripping member is provided with a support element which in normal operation is spaced apart from the conveying belt or is in contact therewith without or with only a slight pressing force, and which rests on the conveying belt when the first stripping element is moved in the direction of travel of the conveying belt, the guide of the rod to which the first stripping element is fixed being shaped and oriented, in relation to the curve of the discharge drum, such that the first stripping element is lifted from the conveying belt when it is moved in the direction of travel of the conveying belt.

A further embodiment of the lifting mechanism which is relatively simple in terms of construction and reliable is characterised by a wedge-like body which defines a slide-on surface or slide-on edge, a or the holder of the first stripping element sliding onto the slide-on surface or slide-on edge and thereby being lifted from the conveying belt when said first stripping element is moved in the direction of travel of the conveying belt.

Another advantageous embodiment of the apparatus according to the invention is characterised in that the lifting mechanism is in the form of an articulated lever mechanism. In this case, the lifting mechanism can preferably be in such a form that in normal operation, that is to say when the upper, first stripping element is resting on the conveying belt in order to strip off material adhering thereto, none of the articulated arms of the articulated lever mechanism is in contact with the conveying belt.

Another advantageous embodiment of the apparatus according to the invention is characterised in that the lifting mechanism is in the form of a spring lever mechanism. In this case too, the lifting mechanism can preferably be in such a form that in normal operation, that is to say when the upper, first stripping element is resting on the conveying belt in order to strip off material adhering thereto, none of the springs (lever springs) of the spring lever mechanism is in contact with the conveying belt.

Another advantageous embodiment of the apparatus according to the invention is characterised in that the stripping members are interconnected by connecting elements, every two adjacent stripping members being interconnected by at least two of the connecting elements. In this embodiment, the stripping members are not interconnected as a result of an elongate carrying element or tension element (for example a wire cable) being guided through through-openings in the stripping members arranged in a row, but the stripping members are interlinked by connecting elements. A flexible or articulated interconnection of the stripping members can thereby be achieved relatively inexpensively.

In this connection, a preferred embodiment of the apparatus according to the invention provides that the first stripping element has a holder connected to the rod, the holders of two adjacent stripping members being interconnected by at least one of the connecting elements, and the connecting elements being in the form of plates or tabs. Another preferred embodiment of the apparatus according to the invention is characterised in that the guide is provided with a projection which has connecting elements for attaching a corresponding projection of an adjacent stripping member.

BRIEF DESCRIPTION OF THE DRAWINGS

The invention will be explained in greater detail below with reference to drawings showing a plurality of embodiments, in which, schematically:

FIG. 4 is a top view of the stripping member of FIG. 2;

FIG. 12 is a top view of the stripping member of FIG. 10;

FIG. 13 is a side view of a sixth embodiment of a stripping member of an apparatus according to the invention on a portion of a conveying belt looped around a discharge drum, in the normal operating state;

FIG. 15 is a side view of a stripping member of the apparatus of FIG. 14 on a portion of a conveying belt looped around a discharge drum;

FIG. 16 is a top view of the stripping member of FIG. 15;

DETAILED DESCRIPTION OF THE INVENTION

Figure 1:
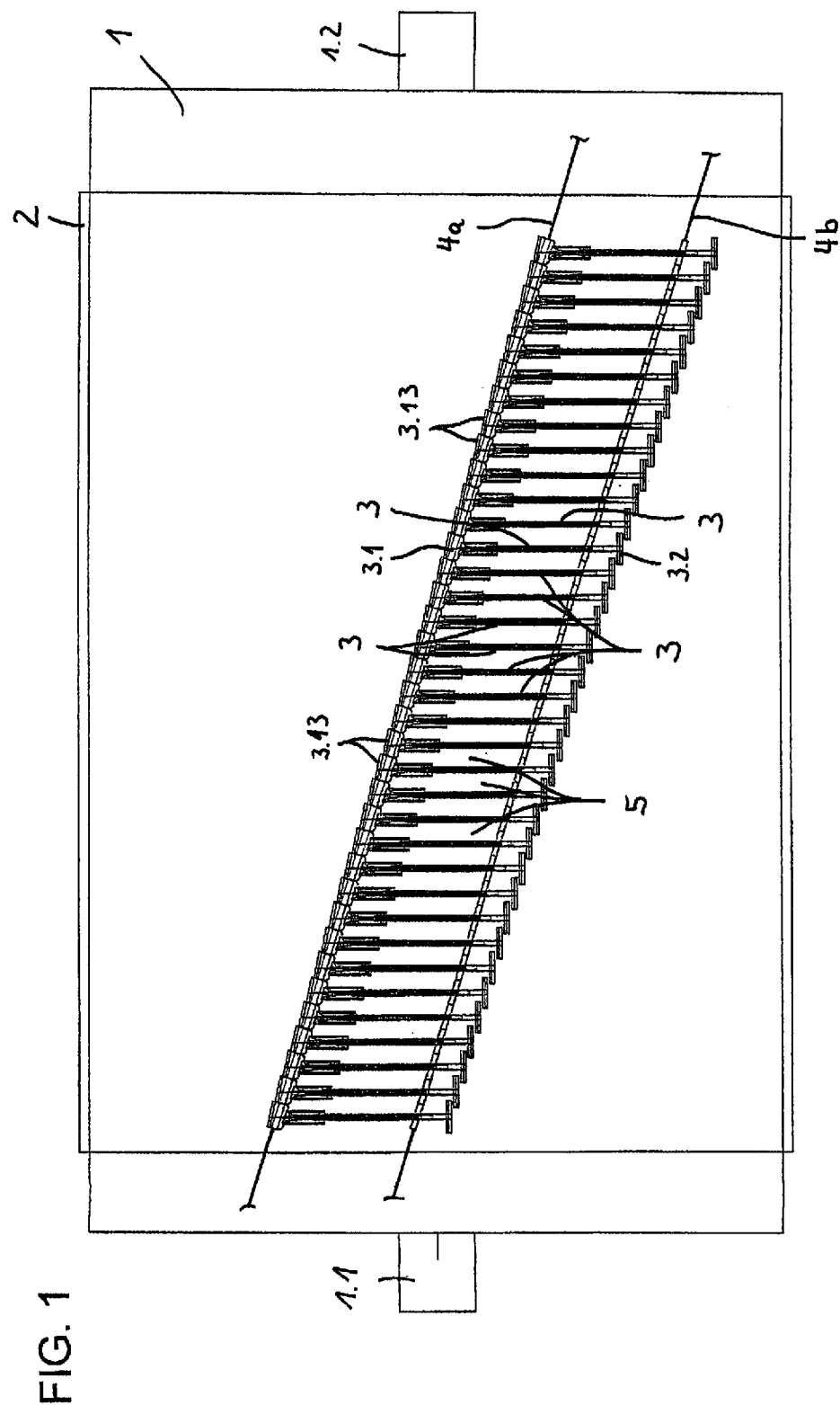
FIG. 1 shows a discharge drum of a belt conveyor having a conveying belt and stripping members arranged in a row of an apparatus according to the invention for stripping off material adhering to the conveying belt.
Figure 9:
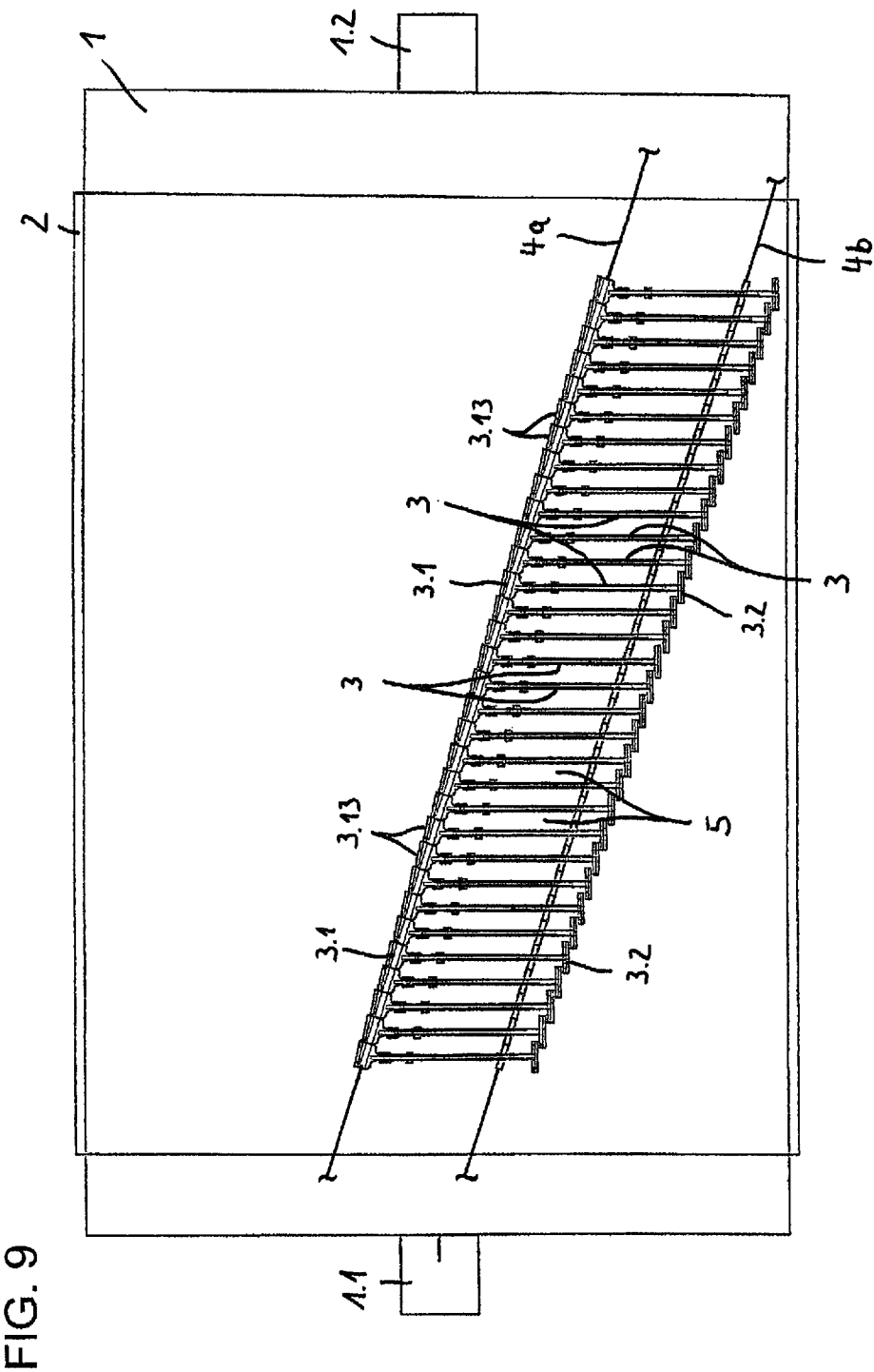
FIG. 9 shows a discharge drum of a belt conveyor having a conveying belt and stripping members arranged in a row of another apparatus according to the invention (fifth embodiment)
Figure 11:
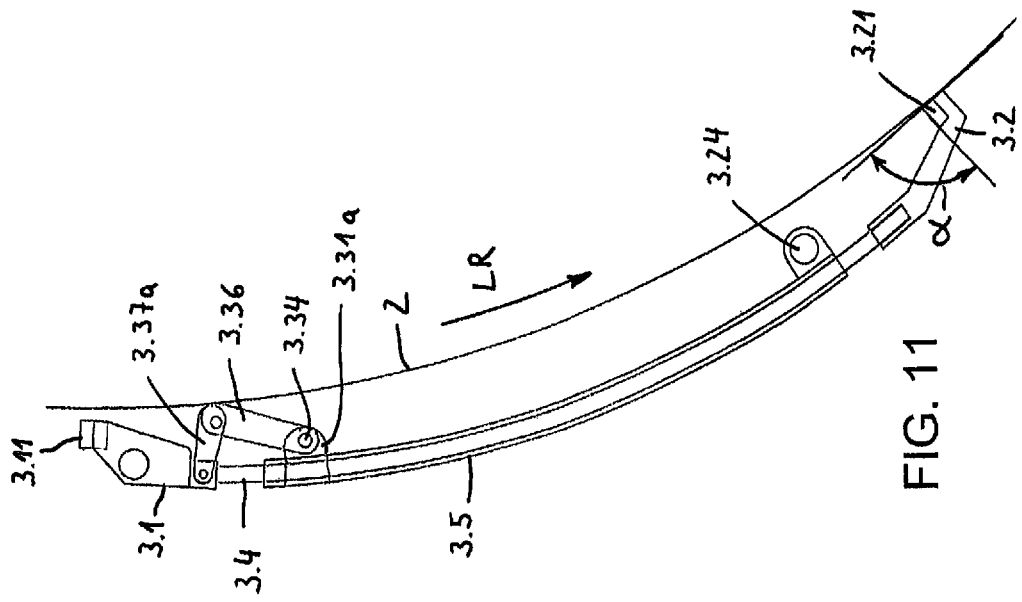
FIG. 10 and FIG. 11 are each a side view of a stripping member of the apparatus of FIG. 9 on a portion of a conveying belt looped around a discharge drum, in the normal operating state and after the upper stripping element (primary stripper) has been moved.
Figure 10:
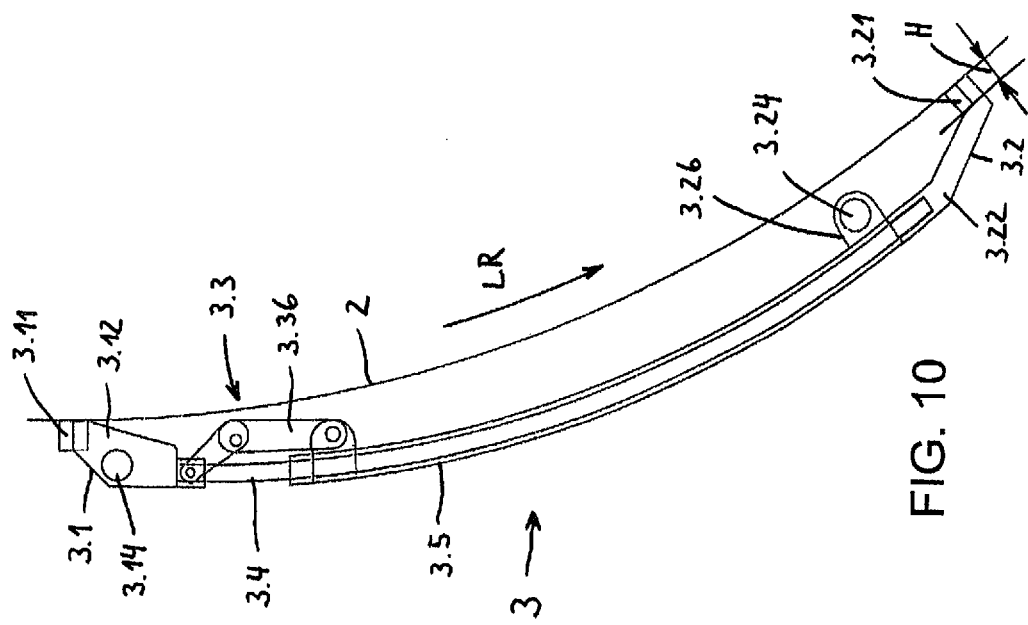

FIGS. 1 and 9 show a discharge or deflecting drum 1 of a belt conveyor. 1.1, 1.2 denote journals or shaft ends of the discharge drum 1. At the curve of the discharge drum 1 around which the belt is looped, and beneath the region in which the conveyed material (not shown) is discharged from the conveying belt 2, there is arranged a stripping apparatus formed of a plurality of stripping members 3 arranged in a row. Conveyed material still adhering to the belt 2 is removed from the belt by the stripping members 3.

The length of the row formed of stripping members 3 corresponds approximately to the width of the conveying belt 2. The stripping members 3 are carried by at least two elongate flexible carrying elements 4*a*, 4*b*. The flexible carrying elements 4*a*, 4*b* consist, for example, of cables, preferably of wire cables. Alternatively or in addition, each carrying element 4a, 4b can also be formed of a metal chain and/or a flexible round steel bar.

The respective stripping member 3 has, when viewed in the direction of travel of the conveying belt 2, a first stripping element 3.1 and a following second stripping element 3.2. The first stripping element 3.1 can also be referred to as the upper stripping element or primary stripper. Correspondingly, the second stripping element 3.2 can also be referred to as the secondary stripper or lower, second stripping element.

The first stripping element 3.1 has a strip-shaped wear body 3.11, which is preferably made of hard metal or ceramics. The wear body 3.11 is fixed to a holder 3.12, which is mounted on the stripping member 3 to be movable in the direction of travel of the conveying belt 2. The direction of travel of the conveying belt 2 is indicated in the drawings by an arrow LR (see for example FIGS. 2 and 3). The wear body 3.11 is preferably arranged on the holder 3.12 in such a manner that it defines an upper edge 3.13 of the stripping member 3.

The second stripping element 3.2 likewise has a strip-shaped wear body 3.21, which is preferably made of hard metal or ceramics. The wear body 3.21 is fixed to a holder 3.22, the holder 3.22 being in such a form that the wear part 3.21 encloses an angle α in the range of from 80° to 100°, preferably from 85° to 95°, with a tangent which runs on the conveying belt 2 at the point of contact of the wear part 3.21. The height H by which the strip-shaped wear body 3.21 projects from the conveying belt 2 is, for example, more than 1.5 cm, preferably more than 2.5 cm.

According to the invention, the stripping member 3 has a lifting mechanism 3.3 which causes the first stripping element 3.1 to be lifted from the conveying belt 2 when the first stripping element 3.1 is moved in the direction of travel of the conveying belt 2. To that end, the first stripping element 3.1 is mounted on the stripping member 3 so as to be movable relative to the lifting mechanism 3.3.

The first stripping element 3.1 is fixed to a rod 3.4 which is held in a movable manner in a guide 3.5, the lifting mechanism 3.3 being mounted or integrally formed on the guide 3.5. The guide 3.5 is in the form of a channel and preferably has a closed cross-sectional profile. The rod 3.4 is resilient and preferably manufactured from spring steel. The guide 3.5 and the rod 3.4 are curved, the curvature of the guide 3.5 and of the rod 3.4 being matched to the curve of the discharge drum 1 of the belt conveyor.

For attachment to the flexible carrying elements 4a, 4b, for example wire cables, each stripping member 3 has a through-opening 3.14 in the holder 3.12 of the first stripping element 3.1 and a through-opening 3.24 in the vicinity of the second stripping element (secondary stripper) 3.2. The through-opening 3.24 in the vicinity of the secondary stripper 3.2 is preferably defined by a sleeve 3.25 which is open at both ends and connected to the guide 3.5 of the rod 3.4 directly or via a tab 3.26. The longitudinal axis of the sleeve 3.25 and the longitudinal axis of the channel-shaped through-opening 3.14 in the holder 3.12 of the upper stripping element 3.1 extend substantially parallel to one another but at an angle to the guide 3.5 and the rod 3.4. The distance between the through-openings 3.14, 3.24 of each stripping member 3 is, for example, in the range of from 15 to 30 cm and can in particular be approximately 20 cm. The distance between the through-openings 3.14, 3.24 of the stripping member 3 depends on the diameter of the discharge drum around which the conveying belt is looped. With a drum diameter in the range of from 80 to 150 cm, the distance between the through-openings 3.14, 3.24 can be approximately 28 cm, for example; with a drum diameter in the range of from 50 to 80 cm, on the other hand, the distance between the through-openings 3.14, 3.24 will be approximately 18 cm, for example. With a smaller drum diameter, for example in the range of from 30 to 50 cm, the distance between the through-openings 3.14, 3.24 of each stripping member 3 will be approximately from 8 to 9 cm, for example.

When the stripping apparatus is in the mounted state, the carrying cables or elongate flexible carrying elements 4a, 4b together with the stripping members 3 arranged in a row run along a space curve, which corresponds to a portion of a helix. The guides 3.5 for the rods 3.4 movable in the direction of travel LR of the belt are arranged parallel to one another and preferably oriented parallel to a radial plane of the discharge drum 1, the radial plane being perpendicular to the axis of rotation of the discharge drum 1. The carrying cables or elongate flexible carrying elements 4a, 4b are fixed to a carrying frame (arm) or side cladding plates (not shown) in the region of the pivot bearings of the discharge drum 1.

It can further be seen from the drawings that the upper edge 3.13 of the wear body 3.11 encloses an acute angle with the longitudinal axis of the channel-shaped through-opening 3.14 of the holder 3.12 (see in particular FIGS. 4 and 12). The stripping members 3 arranged in a row thus define stripping edges 3.13 which face the direction of travel LR of the belt at an angle (see FIGS. 1 and 9). The stripping edges 3.13 of adjacent stripping members 3 are arranged in steps, so that the stripping edge 3.13 of the wear body 3.11 which is at a lower position is partially in the "shadow" of the wear body 3.11 which is at a higher position. This partial overlapping of the upper wear bodies 3.11, together with their position at an angle relative to the direction of travel LR of the belt, ensures that a damaged belt portion or foreign body protruding from the belt surface cannot catch on an individual wear body 3.11.

The lower stripping element 3.2 of each stripping member 3 is designed such that the lower wear bodies 3.21 of adjacent stripping members 3 likewise overlap (see FIGS. 1 and 9). The stripping edges 3.23 defined by the lower wear bodies 3.21 are arranged in steps. The longitudinal axis of each lower wear body 3.21, or the stripping edge 3.23 defined thereby, is oriented substantially parallel to the axis of rotation of the discharge drum 1 when the stripping apparatus is in the mounted state.

The holders 3.12, 3.22 together with the wear bodies 3.11, 3.21 and the sleeve 3.25 serving for the passage of the cable or flexible carrying element 4b protrude relative to the long sides of the guide 3.5 and the rod 3.4 received movably therein, so that elongate through-openings 5 remain between the adjacent stripping members 3, in particular the guides 3.5, through which through-openings any conveyed material detached from the conveying belt 2 can pass radially outwards. An accumulation of detached conveyed material behind the guides 3.5 is prevented by the free spaces defined by said through-openings 5. The guides 3.5 of the rods 3.4 of adjacent stripping members 3 are, for example, spaced apart from one another by a distance which corresponds, for example, at least to four times the width B of each guide 3.5.

The portion of the rod 3.4 that protrudes from the guide 3.5, to which the upper stripping element 3.1 is fixed, can be provided with a flexible sheathing, for example an expansion bellows, which protects the inside of the guide 3.5 from contamination. Such protection from contamination (not shown in the drawings) is preferably provided in all the embodiments of the stripping members 3 shown here.

In the embodiment shown in FIGS. 1 to 4, the guide 3.5 is provided at its upper end with a joint bearing 3.31. A wedge-like body (lever wedge) 3.32, which is part of the lifting mechanism 3.3, is pivotally mounted on the joint bearing 3.31, which is arranged on the side of the guide 3.5 facing the conveying belt 2. The wedge-like body 3.32 defines a slide-on surface or slide-on edge 3.321, the holder 3.12 of the first stripping element 3.1 sliding onto the slide-on surface or slide-on edge 3.321 and thereby being lifted from the conveying belt 2 when said first stripping element is moved in the direction of travel LR of the conveying belt 2 (see FIGS. 2 and 3). The second stripping element 3.2, which is used as the secondary stripper, is fixed to the lower end of the rod 3.4. Above the second stripping element 3.2, a through-opening 3.24 (sleeve 3.25) for passage of one (4b) of the cables or flexible elongate carrying elements is attached to the lower end of the guide 3.5. The through-opening (for example bore) 3.14 for passage of a second cable or flexible elongate carrying element 4a is formed in the holder 3.12 of the upper strip-shaped wear element 3.11.

Figure 3:
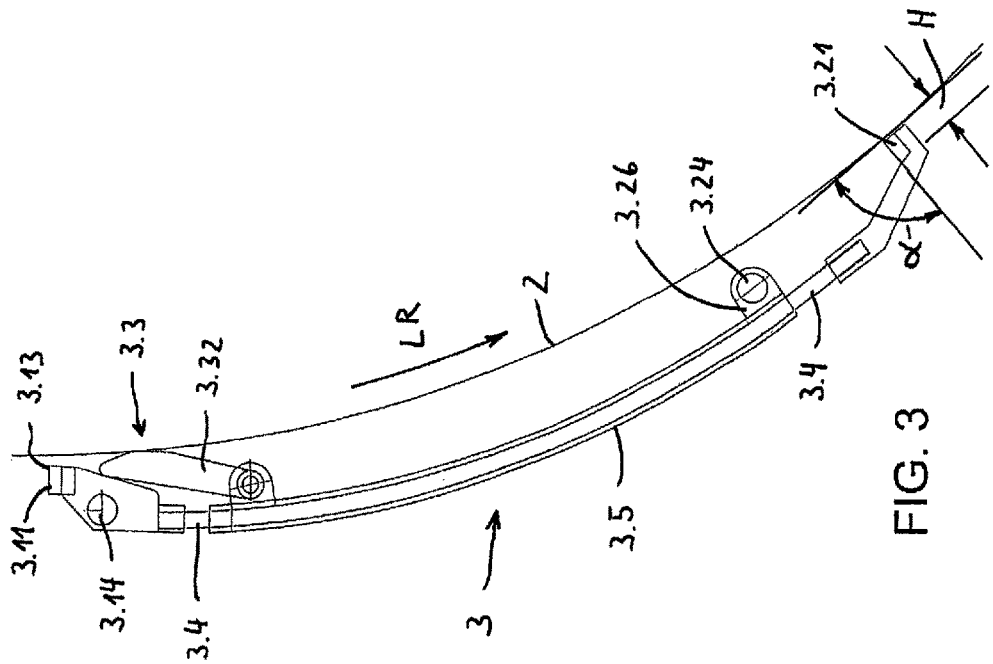
FIG. 2 and FIG. 3 are each a side view of a stripping member of the apparatus of FIG. 1 on a portion of a conveying belt enlaced around a discharge drum, in the normal operating state and after the upper stripping element (primary stripper) has been moved.
Figure 2:
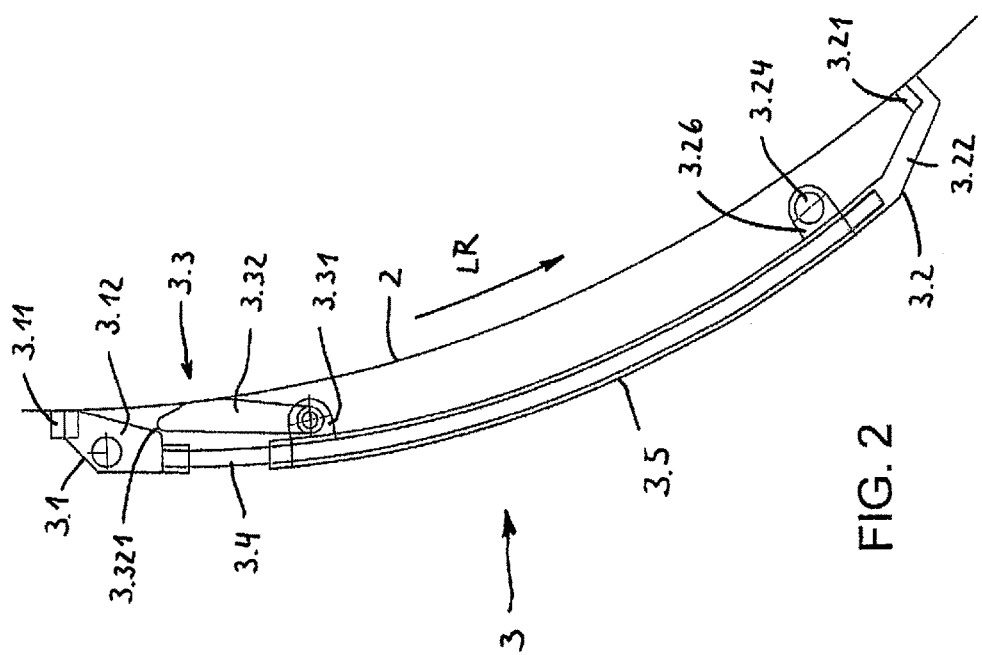
Figure 5:
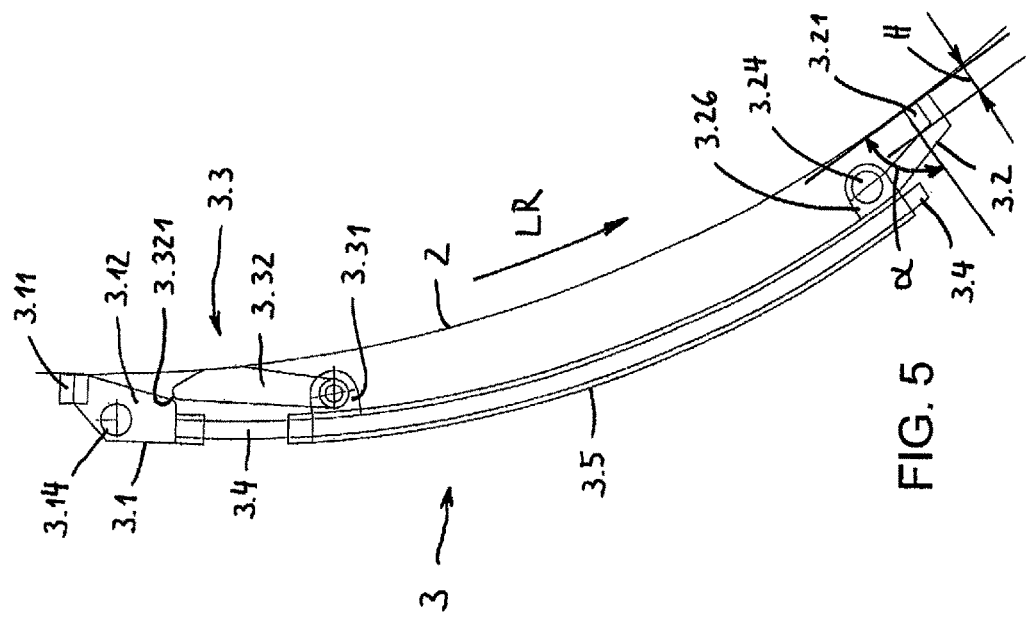
FIG. 5 is a side view of a second embodiment of a stripping member of an apparatus according to the invention on a portion of a conveying belt looped around a discharge drum, in the normal operating state.

The stripping member 3 shown in FIG. 5 differs from the embodiment shown in FIGS. 2 to 4 in that the second stripping element 3.2 is fixed not to the lower end of the movable rod 3.4 but to the lower end of the guide 3.5.

Figure 7:
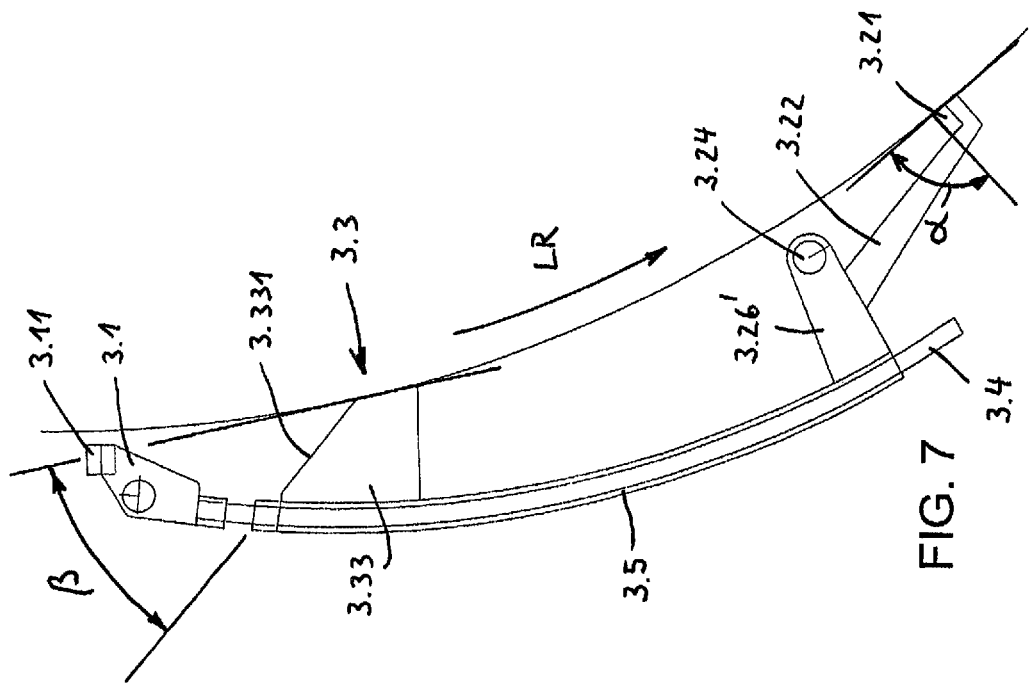
FIG. 6 and FIG. 7 are each a side view of a third embodiment of a stripping member of an apparatus according to the invention on a portion of a conveying belt looped around a discharge drum, in the normal operating state and after the upper stripping element (primary stripper) has been moved.
Figure 6:
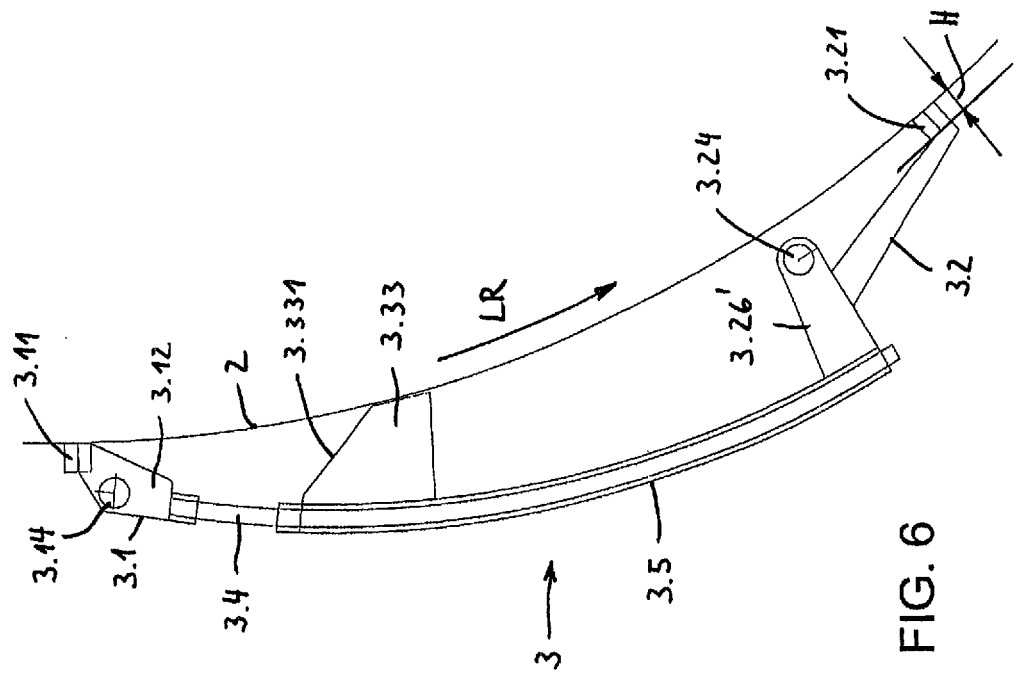

FIGS. 6 and 7 show another embodiment of a stripping member of an apparatus according to the invention. The curved guide 3.5 of the rod 3.4, to which the first stripping element 3.1 is fixed, is here provided with a support element 3.33, which in normal operation is arranged at a small distance from the conveying belt 2 or is in contact therewith without or with only a slight pressing force and which rests on the conveying belt 2 when the first stripping element 3.1 is moved in the direction of travel LR of the belt. The support element 3.33 is in the form of a web or plate. Its front edge 3.331 extends at an angle to a tangent with the conveying belt 2, so that the tangent encloses an angle β in the range of from 35° to 50° with the front edge 3.331. At the end of the curved guide 3.5, a tab 3.26' which extends in the direction of the drum is fixed to the guide 3.5. The tab 3.26' has a through-opening 3.24 or sleeve 3.25 for passage of one of the cables or flexible elongate carrying elements. A second through-opening (for example bore) 3.14 for passage of a second cable or flexible elongate carrying element 4a is in turn formed in the holder 3.12 of the upper strip-shaped wear element 3.11. A holder 3.22 for the lower strip-shaped wear element 3.21 is additionally integrally formed on or fixed to the tab 3.26'. When the stripping member 3 is in the mounted state, the tab 3.26' terminates at a distance from the conveying belt 2, while the second wear element 3.21 is in contact with the conveying belt 2 under contact pressure owing to the cable or flexible carrying element 4b guided through the through-opening 3.24 or sleeve 3.25 and tensioned. The guide 3.5 of the rod 3.4, which is preferably made of spring steel, is shaped and oriented relative to the curve of the discharge drum 1 such that the first stripping element 3.1 fixed to the upper end of the rod 3.4 is lifted from the conveying belt 2 when it is moved in the direction of travel LR of said conveying belt (see FIGS. 6 and 7).

Figure 8:
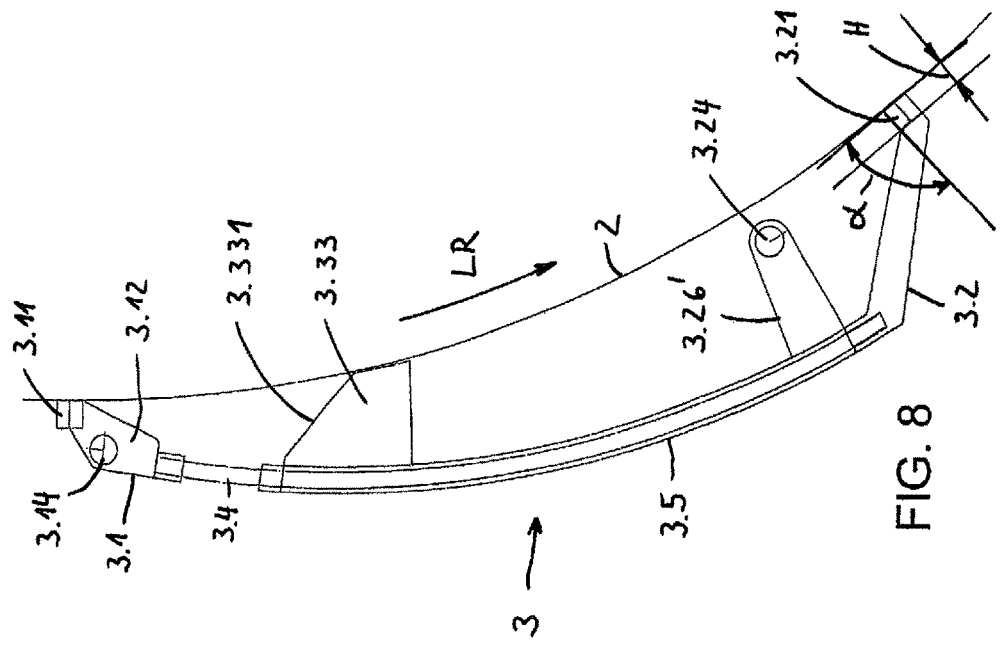
FIG. 8 is a side view of a fourth embodiment of a stripping member of an apparatus according to the invention on a portion of a conveying belt looped around a discharge drum, in the normal operating state.

The embodiment shown in FIG. 8 differs from the example shown in FIGS. 6 and 7 in that the second stripping element (secondary stripper) 3.2 is fixed to the lower end of the rod 3.4 protruding from the tubular guide 3.5. In this respect, this variant is similar to the embodiment shown in FIGS. 2 and 3.

Another embodiment of the apparatus according to the invention is shown in FIGS. 9 to 12. In this case, the lifting mechanism 3.3, which causes the first stripping element (primary stripper) 3.1 to be lifted from the conveying belt 2 when that stripping element 3.1 is moved in the direction of travel LR of the conveying belt 2, is in the form of an articulated lever mechanism. To that end, two tabs 3.31a, 3.31b which protrude towards the conveying belt 2 and have mutually aligned bores (through-holes) 3.34 are fixed to the upper end of the curved guide 3.5. The tabs 3.31a, 3.31b define a forked joint bearing. Another bore 3.35, the axis of which runs parallel to the joint axis defined by the tabs 3.31a, 3.31b, is formed on the holder 3.12, connected to the rod 3.4, of the upper wear body 3.11. An articulated lever 3.36 is articulated to the tabs 3.31a, 3.31b, which articulated lever is connected to two articulated levers 3.37a, 3.37b which are arranged parallel to one another and are articulated to the bore 3.35 in the holder 3.12 of the wear body 3.11. The articulated lever 3.36 pivotally mounted on the tabs 3.31a, 3.31b is significantly longer than the articulated lever 3.37a, 3.37b pivotally mounted on the holder 3.12. In normal operation of the stripping member 3, the articulated levers 3.36, 3.37a, 3.37b are spaced apart from the conveying belt 2, while the upper wear body 3.11 of the stripping element 3.1 rests on the conveying belt 2 (see FIG. 10). If the first stripping element 3.1 is moved in the direction of travel LR of the belt by a damaged belt portion protruding from the conveying belt 2 or by a foreign body lodged in the conveying belt 2, the articulated levers 3.36, 3.37a, 3.37b pivot towards the conveying belt 2, come into contact with the conveying belt 2 and rest thereon, so that the holder 3.12 of the first stripping element 3.1 together with the wear body 3.11 is lifted from the conveying belt 2 (see FIG. 11).

The second stripping element 3.2, following in the direction of travel LR of the belt, of the stripping member 3 according to the embodiment shown in FIGS. 8 to 12 is fixed to the lower end of the rod 3.4 protruding from the tubular guide 3.5. In this respect, this variant is similar to the embodiment shown in FIGS. 1 to 4. The through-opening 3.24 (sleeve 3.25) for the lower cable or flexible elongate carrying element 4b is in turn also arranged at the lower end of the curved guide 3.5.

Another embodiment of a stripping member 3 according to the invention is shown in FIG. 13. This variant differs from the embodiment shown in FIGS. 10 and 11 in that the lower, second stripping element (secondary stripper) 3.2 is arranged before the through-opening 3.24 (sleeve 3.25) for the lower cable or flexible elongate carrying element 4b in the direction of travel LR of the belt. The through-opening 3.24 (sleeve 3.25) is arranged at the lower end of the curved guide 3.5, on the side of the guide 3.5 facing the conveying belt 2. This variant has the advantage that the upper stripping element 3.1 pivots away from the conveying belt 2 if the upper cable or flexible elongate carrying element 4a were to break. Accidental damage to the conveying belt 2 by the upper stripping element 3.1 is thus prevented.

Figure 14:
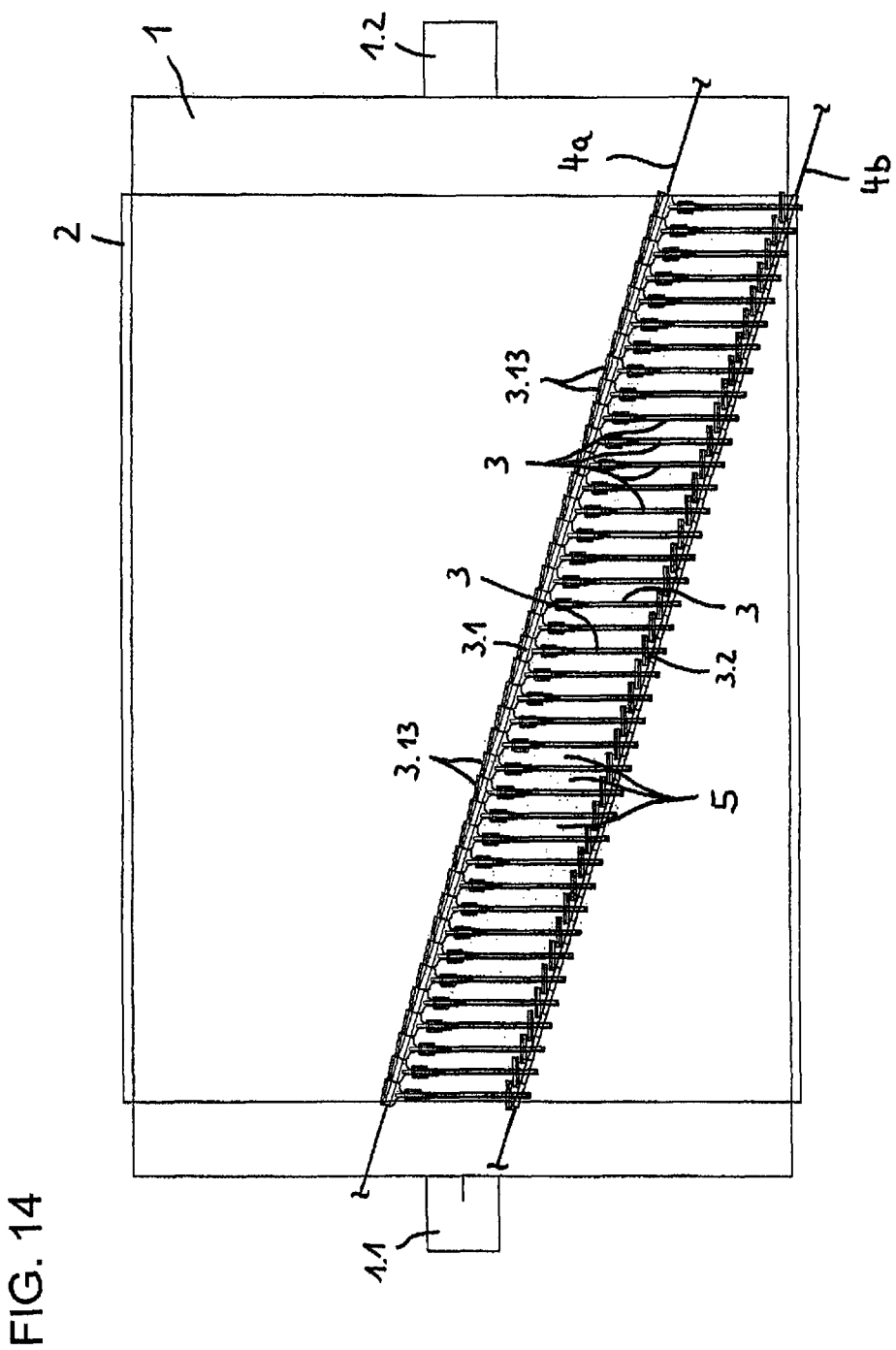
FIG. 14 shows a discharge drum of a belt conveyor having a conveying belt and stripping members arranged in a row of another apparatus according to the invention (seventh embodiment)

The embodiment of the apparatus according to the invention shown in FIGS. 14 to 16 differs from the variant shown in FIG. 13 in that the lifting mechanism 3.3, which causes the first stripping element 3.1 to be lifted from the conveying belt 2 when that stripping element 3.1 is moved in the direction of travel LR of the conveying belt 2, is in the form of a spring lever mechanism. To that end, there is fastened to the upper end of the curved guide 3.5 at least one tab 3.31' which protrudes in the direction of the conveying belt 2 and has an opening or a gap 3.34'. The opening or gap 3.34' is used for the rotatable mounting of a leg spring 3.38. The opening (gap) 3.34' opens on a side of the tab 3.31' facing the first stripping element 3.1. The leg spring 3.38 has a stirrup-shaped portion 3.381, the leg of which preferably merges into helical portions 3.38a, 3.38b. Each helical portion 3.38a, 3.38b here consists of a single winding, for example. The helical portion 3.38a, 3.38b is followed integrally by a leg 3.382, 3.383 which is connected to the rod 3.4 or the holder 3.12. The legs 3.382, 3.383 are bent at their ends so that their end faces face one another. The ends are inserted in an interlocking and rotatable manner in recesses or bores 3.121, 3.122 in the holder 3.12.

In normal operation of the stripping member 3, the helical portions (windings) 3.38a, 3.38b of the leg spring 3.38 are spaced apart from the conveying belt 2, while the upper wear body 3.11 of the stripping element 3.1 rests on the conveying belt 2 (see FIG. 15). If the first stripping element 3.1 is moved in the direction of travel LR of the belt by a damaged belt portion protruding from the conveying belt 2 or by a foreign body lodged in the conveying belt 2, the windings 3.38a, 3.38b move towards the conveying belt 2, come into contact with the conveying belt 2 and rest thereon. The legs 3.382, 3.383 of the spring 3.38 thereby act as levers and, when the windings 3.38a, 3.38b have come into contact with the conveying belt and are resting thereon, lift the holder 3.12 of the first stripping element 3.1 together with the wear body 3.11 from the conveying belt 2.

Figure 17:
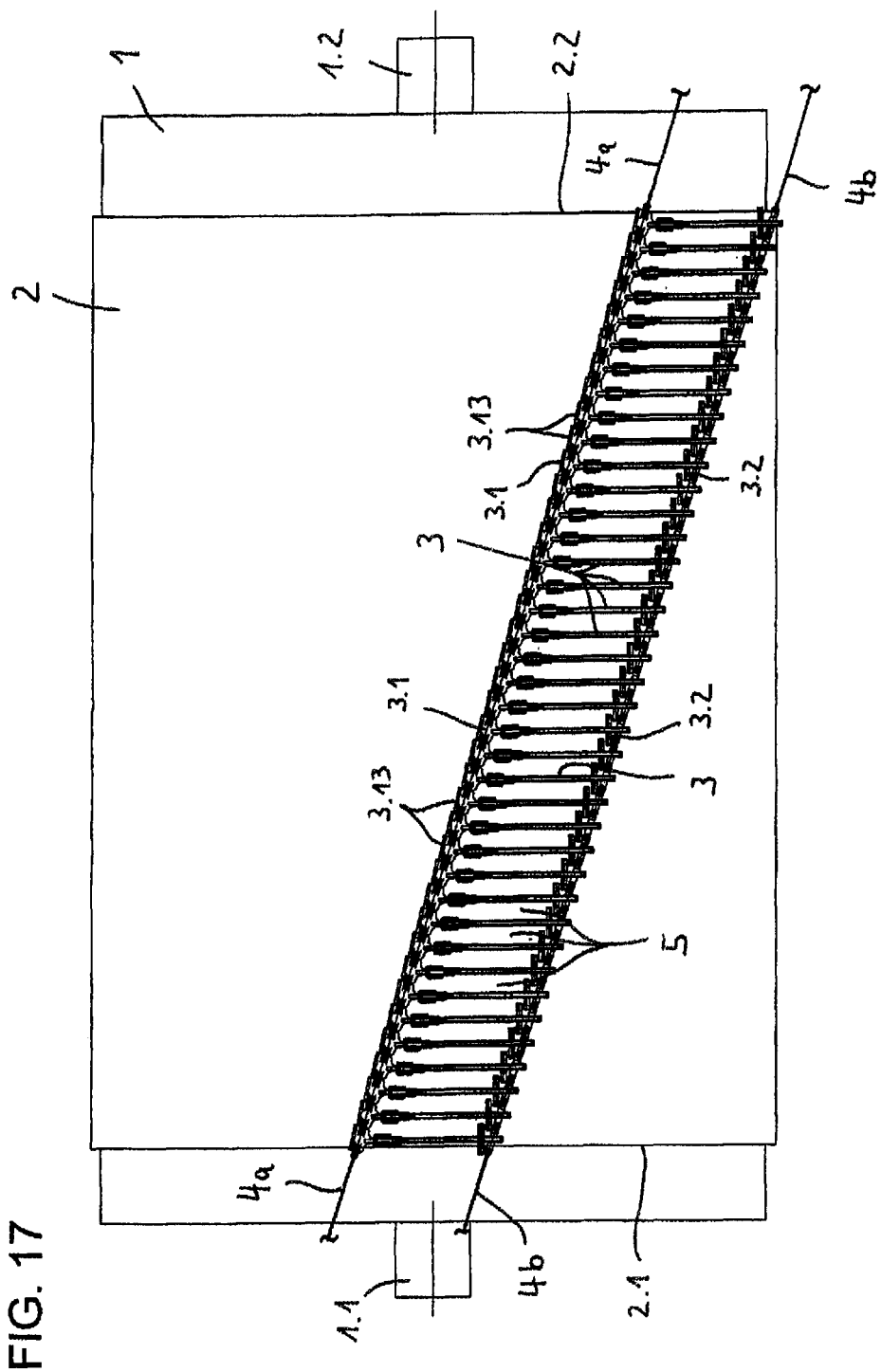
FIG. 17 shows a discharge drum of a belt conveyor having a conveying belt and stripping members arranged in a row of another apparatus according to the invention (eighth embodiment)
Figure 18:
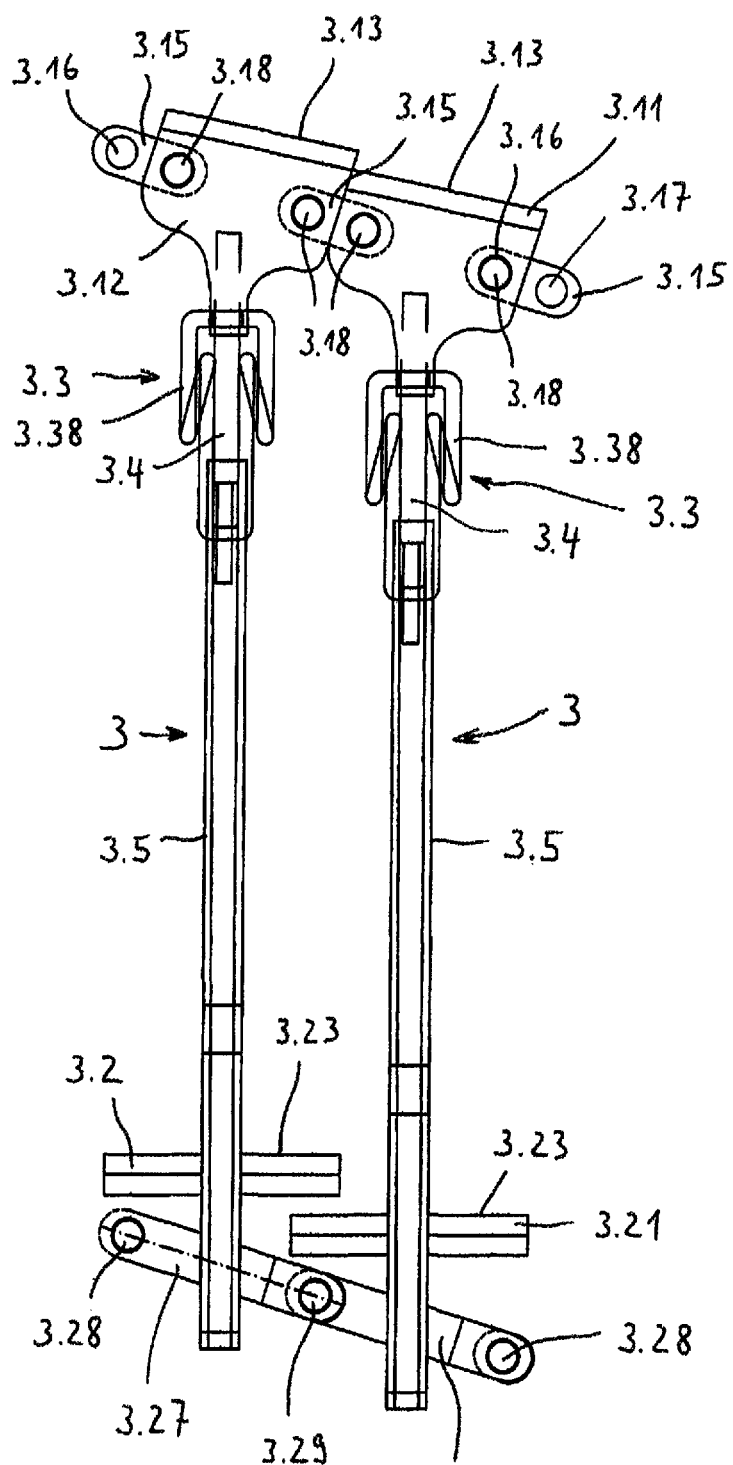
FIG. 18 is a top view of two interconnected stripping members of the apparatus of FIG. 17.

The embodiment of the apparatus according to the invention shown in FIGS. 17 and 18 differs from the embodiments shown hereinbefore in that the stripping members 3 are interconnected not by elongate carrying elements such as cables but by connecting elements 3.15, 3.27 in the form of plates or tabs, every two adjacent stripping members 3 being interconnected by at least two such connecting elements 3.15, 3.27.

To that end, the first stripping element 3.1 of each stripping member 3 in turn has a holder 3.12 connected to the rod 3.4. The holders 3.12 of two adjacent stripping members 3 are interconnected by a connecting element 3.15 in the form of a plate or tab. Each connecting element 3.15 has two through-openings or bores 3.16, 3.17, into which there engage in an interlocking manner bolts 3.18 which are connected, for example screwed, to the holder 3.12 or "cams" or pins produced by casting. The adjacent holders 3.12 are interconnected in an articulated manner by the connecting element 3.15 in the form of a plate or tab.

The guide 3.5 of the rod 3.4 is provided with a tab-shaped projection 3.27 as a connecting element. The projection 3.27 can also be referred to as a cross-member or connecting part. The projection 3.27 is preferably arranged after the second stripping element 3.2, when viewed in the direction of travel LR of the conveying belt 2. For the attachment of a corresponding projection 3.27 of an adjacent stripping member 3, the projection 3.27 has through-openings or bores 3.28 into which connecting bolts 3.29 are inserted or can be inserted. The tab-shaped projection 3.27 extends at an angle to the longitudinal axis of the guide 3.5.

The number of stripping members 3 to be interconnected depends on the width of the conveying belt 2 to be cleaned. For example, a sufficient number of stripping elements 3 is arranged in a row and interconnected flexibly or in an articulated manner that the stripping body composed of the stripping members 3 extends from one belt edge 2.1 to the other belt edge 2.2. For the arrangement of the stripping body along a space curve of the discharge drum 1 diverting the conveying belt 2, flexible or resilient carrying elements 4a, 4b in the form of cables, chains, spring bars or the like are mounted at the ends of the stripping body. The ends of these elongate carrying elements 4a, 4b are to that end attached, for example, to the through-openings or bores 3.16, 3.17 or 3.28 of the connecting elements 3.15 in the form of plates or tabs or of the projections (connecting parts) 3.27.

The execution of the present invention is not limited to the embodiments shown in the drawings. In fact, a large number of further variants is conceivable, which variants also make use of the invention described in the accompanying claims in a form that differs from the illustrated examples. For example, the connecting tab 3.15 in FIG. 18 could also be designed to be inseparable and/or integral with the holder 3.12 on one side and, on the other hand, be designed to be connected on the other side to the holder 3.12 of an adjacent stripping member 3 in a separable manner. Furthermore, the embodiment shown in FIG. 5 can be modified such that the through-opening 3.24 for attaching the lower cable or elongate carrying element 4b is arranged after the second stripping element (secondary stripper) 3.2 in the direction of travel LR of the conveying belt 2. Furthermore, each stripping member 3 can also have clamps instead of the through-openings 3.14, 3.24 for attaching the flexible carrying elements 4a, 4b.

The invention claimed is:

1. An apparatus for stripping off material from a conveying belt of a belt conveyor in the region of the curve of a discharge drum, beneath the discharge area of the belt conveyor, having a plurality of stripping members which are arranged in a row and are carried by at least two elongate carrying elements spaced apart from one another, at least one of the stripping members having a first stripping element and a second stripping element following the first stripping element in the direction of travel of the conveying belt, wherein the stripping member, which comprises the first stripping element and the second stripping element following in the direction of travel of the conveying belt, comprises a lifting mechanism which causes the first stripping element to be lifted from the conveying belt when the first stripping element is moved in the direction of travel of the conveying belt, wherein the first stripping element being mounted on the stripping member so as to be movable relative to the lifting mechanism, and wherein the first stripping element is fixed to a rod which is held in a movable manner in a guide, the lifting mechanism being attached to or integrally formed on the guide.

2. The apparatus according to claim 1, wherein the guides of the rods of adjacent stripping members are spaced apart from one another by a distance which is greater than a width, of the respective guide.

3. The apparatus according to claim 1, wherein the second stripping element is fixed to the guide.

4. The apparatus according to claim 1, wherein the second stripping element is fixed to the rod.

5. The apparatus according to claim 1, wherein the rod is manufactured from spring steel.

6. The apparatus according to claim 1, wherein at least one of the guide and the rod is curved, curvature of the guide being matched to the curve of the discharge drum of the belt conveyor.

7. The apparatus according to claim 1, wherein the second stripping elements of adjacent stripping members are arranged so as to overlap, in such a manner that a stripping element is partially covered by a stripping element of an adjacent stripping member that is located in front of it, when viewed in the direction of travel of the conveying belt, and that same stripping element partially covers a stripping element of an adjacent stripping member that is located behind it, when viewed in the direction of travel of the conveying belt.

8. The apparatus according to claim 1, wherein the lifting mechanism is an articulated lever mechanism or spring lever mechanism.

9. The apparatus according to claim 1, wherein the lifting mechanism has a wedge-like body which defines a slide-on surface or slide-on edge, a holder of the first stripping element sliding onto the slide-on surface or slide-on edge and thereby being lifted from the conveying belt when the first stripping element is moved in the direction of travel of the conveying belt.

10. The apparatus according to claim 1, wherein each elongate carrying element is flexible and/or resilient.

11. The apparatus according to claim 1, herein each elongate carrying element comprises at least one wire cable, at least one spring steel rod, and/or at least one metal chain.

12. The apparatus according to claim 1, wherein the stripping members arranged in a row can be positioned along a space curve on the discharge drum by means of the carrying elements.

13. The apparatus according to claim 1, wherein the guide is provided with a projection which has a through-opening or clamp for attaching the at least one second elongate carrying element.

14. The apparatus according to claim 13, wherein the through-opening or clamp for attaching the at least one second elongate carrying element is arranged after the second stripping element in the direction of travel of the conveying belt.

15. The apparatus according to claim 1, wherein the first stripping element has a holder which is connected to the rod and which has a through-opening or clamp for attaching one of the elongate carrying elements.

16. The apparatus according to claim 1, wherein the stripping members are interconnected by connecting elements, every two adjacent stripping members being interconnected by at least two of the connecting elements.

17. The apparatus according to claim 16, wherein the first stripping element has a holder connected to the rod, the holders of two adjacent stripping members being interconnected by at least one of the connecting elements, and the connecting elements being in the form of plates or tabs.

18. The apparatus according to claim 16, wherein the guide is provided with a projection as a connecting element for attaching a corresponding projection of an adjacent stripping member.

19. The apparatus according to claim 18, wherein the projection is arranged after the second stripping element when viewed in the direction of travel of the conveying belt.

20. The apparatus according to claim 2, wherein the guides of the rods of adjacent stripping members are spaced apart from one another by a distance which is greater than twice the width of the respective guide.

* * * * *

UNITED STATES PATENT AND TRADEMARK OFFICE
CERTIFICATE OF CORRECTION

PATENT NO.       : 9,617,081 B2
APPLICATION NO.  : 15/103514
DATED            : April 11, 2017
INVENTOR(S)      : Wilfried Dünnwald Page 1 of 1

It is certified that error appears in the above-identified patent and that said Letters Patent is hereby corrected as shown below:

Column 13, Line 16, Claim 11, delete "herein" and insert -- wherein --

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*